United States Patent [19]

Endo

[11] Patent Number: 4,572,786

[45] Date of Patent: Feb. 25, 1986

[54] OILY WATER SEPARATING APPARATUS FOR THE SHIP

[75] Inventor: Isao Endo, Tottori, Japan

[73] Assignee: Yks Co., Ltd., Osaka, Japan

[21] Appl. No.: 634,362

[22] Filed: Jul. 25, 1984

[30] Foreign Application Priority Data

Aug. 11, 1983 [JP] Japan ................................. 58-147446

[51] Int. Cl.$^4$ ......................... B03D 3/06; B01D 43/00; B01F 3/04
[52] U.S. Cl. .................................... 210/188; 210/199; 210/202; 210/221.1; 210/258
[58] Field of Search ............... 210/188, 199, 202, 218, 210/221.1, 221.2, 258, 259

[56] References Cited

U.S. PATENT DOCUMENTS

| | | | |
|---|---|---|---|
| 2,190,596 | 2/1940 | Dorr | 210/199 X |
| 2,206,358 | 7/1940 | Koinzan | 210/188 X |
| 2,765,919 | 10/1956 | Juell | 210/202 X |
| 3,243,046 | 3/1966 | Kakumoto et al. | 210/199 |
| 3,521,752 | 7/1970 | Lindman | 210/199 X |
| 3,875,060 | 4/1975 | Noma | 210/199 |
| 3,948,774 | 4/1976 | Lindman | 210/202 X |
| 4,031,006 | 6/1977 | Ramirez et al. | 210/221.2 X |
| 4,251,361 | 2/1981 | Grimsley | 210/221.2 X |
| 4,324,656 | 4/1982 | Godar | 210/202 X |
| 4,498,986 | 2/1985 | Temme et al. | 210/199 |

FOREIGN PATENT DOCUMENTS 1184477 3/1970 United Kingdom .
1471165 4/1977 United Kingdom .
1577621 10/1980 United Kingdom .

Primary Examiner—Robert Spitzer
Attorney, Agent, or Firm—Koda and Androlia

[57] ABSTRACT

An apparatus for separating oil from water, particularly from sea water, having high separating performance, being compact in size so as to be installed in a limited or small space such as a ship, and running at a low cost. The separating apparatus includes a separator in which oil in the water comes up by gravity difference, a flocculating device with a mixer and a flocculant supplying system, the mixer mixing the flocculant and water to attain a flocculation of the suspended material from the separator, a pressurized floating separator for floating and separating the flock under pressure as receiving the fluid from the flocculating device, a gas-liquid mixing-dissolving device taking bubbling water into the fluid which is sent from the flocculating device connected to the lower part of the pressure floating separator, and a filter for removing the remaining oil by passing the fluid from the pressurized separator.

18 Claims, 12 Drawing Figures

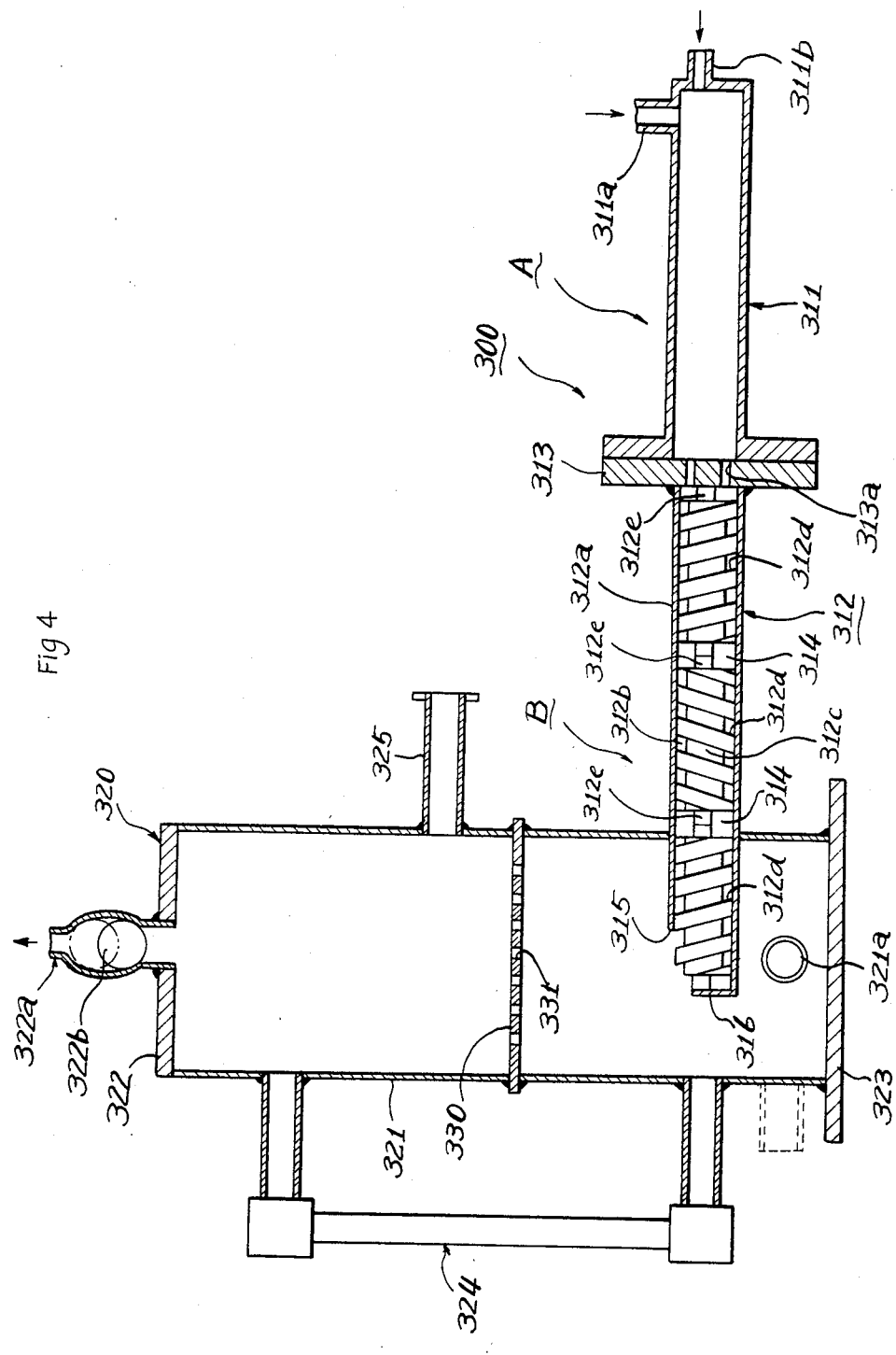

OILY WATER SEPARATING APPARATUS FOR THE SHIP

BACKGROUND OF THE INVENTION

1. Field of the Invention

The present invention relates to oily water separating apparatus for the ship and more particularly, to separation and elimination of oil contained fresh water or sea water.

2. Prior Art

Conventionally, as an apparatus for separating water and oil, for example, the separating tank separates oil to bond, settle and float utilizing buoyancy and setting of oil itself.

SUMMARY OF THE INVENTION

Accordingly, it is an object of the present invention to provide an oily water separating apparatus which has high separating ability and compact to be installed even in a limited small space in the ship, and also requires low running cost, through elimination of disadvantages in the prior art arrangement as described above.

For accomplishing the above and other objects, the present invention comprises as follows. A separating tank making float the oil in the water by gravity difference, a flocculating apparatus having mixing apparatus for flocculant and water and flocculant supplying system so as to attain the flocculation of the suspended material from the separating tank, a pressurized floating separating tank floating and separating the flock under pressure receiving the fluid from the flocculating apparatus, a gas and liquid mixing and dissolving apparatus leading the bubble water into the fluid from the flocculating apparatus connected to the lower part of the pressure floating separating tank, and a filter part eliminating remained oil passing the fluid from the pressure floating separating tank.

The separating tank is so arranged that vortex-like flow passages are formed in an interior by a vortex-like partition plate at a horizontal cross section, while an inlet port or outlet port of an impurity-mixed fluid is provided in the lower portion of a tank at the central portion or end portion of said vortex-like flow passages, with an impurity outlet port being provided at the upper portion of the tank.

The mixing apparatus which includes an inlet cylinder portion for receiving fluids to be mixed as introduced thereinto, and spiral flow passage members having spiral flow passages directed therearound through more than 360° and connected to a forward end of said inlet cylinder portion.

The pressurized floating separating tank comprises, a vertical first cylinder having filthy water inlet at lower partion, a second cylinder concentrically provided with said first cylinder so as to externally cover the latter through a gap and provided purified water outlet at bottom, a filthy matter lead-out pipe having a portion reduced in its diameter and connected to the upper end of the second cylinder, a bubble mixed water lead-in pipe connected at the lower end of the first cylinder.

The gas and liquid mixing and dissolving apparatus which includes a gas and liquid mixing section for introducing and mixing the gas and liquid, a gas dissolving section having spiral flow passage members connected to a downstream side of said gas and liquid mixing section for forming the spiral flow passages, and a surplus gas separating tank in which the end portion of said gas dissolving section is opened and which is intended to separate and discharge the surplus gas.

Here, the first point of the invention is to combine the separating tank and the pressurized floating separating tank, the second point of the invention is to combine the separating tank, the pressurized floating separating tank and the mixing apparatus, the third point is to combine the separating tank, the pressurized floating separating tank, the gas and liquid mixing and dissolving apparatus, furthermore the fourth point is to combine four apparatus of the separating tank, the pressurized floating separating tank, the mixing apparatus and the gas and liquid mixing and dissolving apparatus.

And also, the fifth point of the invention is to combine the mixing apparatus and the pressurized floating separating tank, the sixth point is to combine the mixing apparatus and the gas and liquid mixing and dissolving apparatus, the seventh point is to combine the pressurized floating separating tank and gas and liquid mixing and dissolving apparatus, the eighth point is to combine three apparatus of the mixing apparatus, pressurized floating separating tank and gas and liquid mixing and dissolving apparatus.

Still more, the nineth point is the gas and liquid mixing and dissolving apparatus.

According to the present invention, since the vortex-like flow passages are formed by dividing the interior of the separating tank by the vortex-like partition plate, a long flow passage is formed within the tank through a small space occupied, whereby effective floating and separation of impurities or filthy matters may be effected by a small area, and thus, a compact separating tank can be produced through a simple construction at low cost. Accordingly, it has become possible to achieve a sufficient separating effect even in a limited place for installation.

The pressurized floating separating tank is compact in construction, the water does not mix in the filthy matter led out and can save the water, furthermore filthy matter difficult to float can float efficiently by the action of the reflux part. Then, the filthy matter can be certainly separated and eliminated, thereby water cleaning effect improved. And also, the first cylinder of vertical has the inlet of filthy water and bubble mixed water in the lower part, the rising flow occurs in the first cylinder and filthy matter does not stay on the bottom of the first cylinder.

Since the spiral flow passages are formed within the mixing apparatus in a flocculating apparatus, the flow passages are elongated even within the short linear distance to provide a long mixing process as desired. Accordingly, not only the mixing efficiency is enchanced, but it becomes possible to achieve a compact size for the mixing apparatus on the whole.

In the gas and liquid mixing and dissolving apparatus, the gas may be dissolved in a short period of time, while the size of the tank can be markedly reduced. Moreover, owing to the fact that a fine gas bubble mixed liquid is instantaneously produced from the above gas dissolved liquid, with the gas bubbles being stably maintained over a long period of time, it has become possible to markedly improve the purifying efficiency when the apparatus of the present invention is applied, for example, to a water treating arrangement.

Accordingly, the apparatus according to the invention is high in water cleaning ability, compact in construction, needs not wide setting area and is water treatment apparatus of low running cost.

BRIEF DESCRIPTION OF THE DRAWINGS

FIG. 1b is a cross section taken along the line Ia—Ia in FIG. 1a.

FIG. 4 is a longitudinal side sectional view of the gas and liquid mixing and dissolving apparatus.

DETAILED DESCRIPTION OF THE INVENTION

Figure 1:
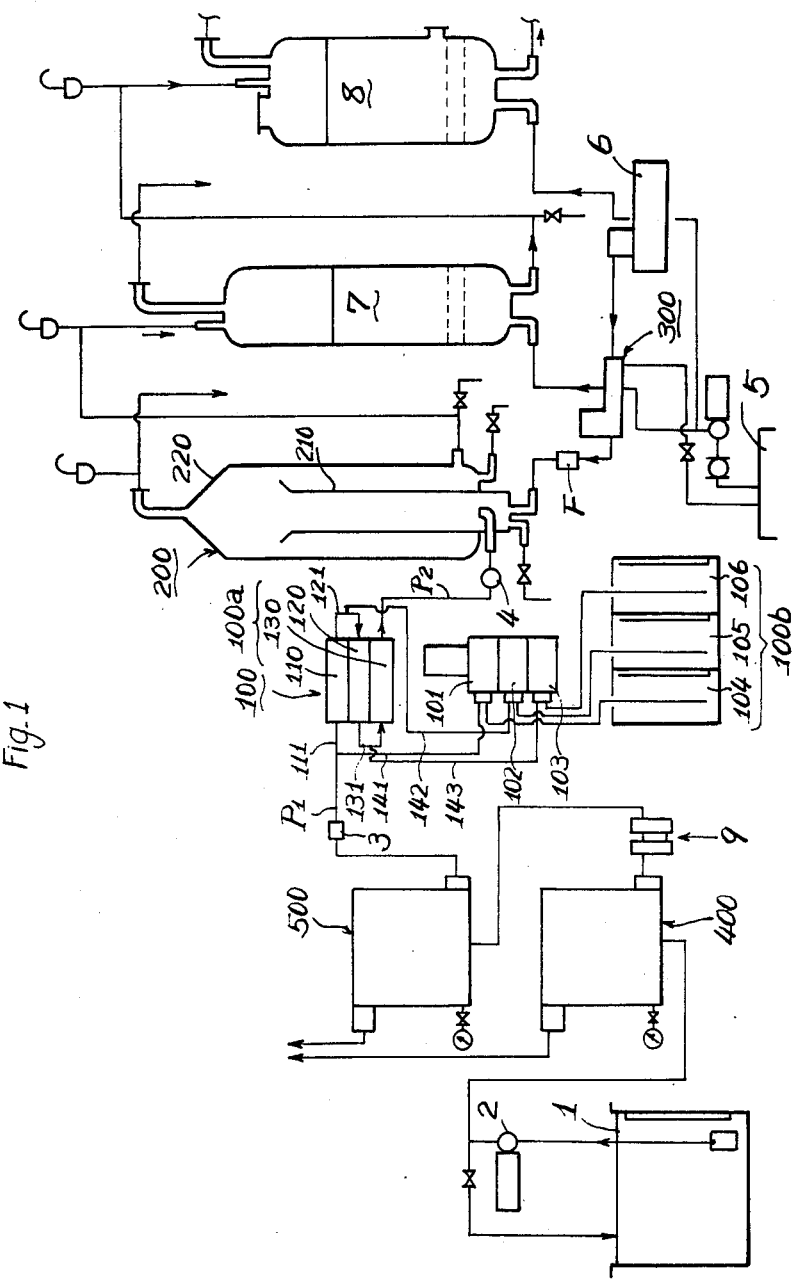
FIG. 1 is a systematic diagram showing an arrangement according to one preferred embodiment of the present invention, From FIG. 1a to FIG. 4 are partially enlarged view of the FIG. 1.

Referring now to the drawings, one preferred embodiment of the present invention will be described based on an oily water separating apparatus taken as an example.

First, an outline of the whole of this apparatus will be given. In FIG. 1, filthy water is led into a first separating tank 400 from a filthy water tank 1 by a filthy water pump 2. In the separating tank 400, large-grained floated oil is separated, and the water passes a coarse grain making member 9 such as wire mesh and its remained oil is made coarse grain, and led into a second separating tank 500. Here, also said coarse grain oil is floated, separated and eliminated. And, the constant flow water eliminated large grain oil is led to an oil component flocculating apparatus 100 via a constant flow valve 3.

Here treated water added chemicals is led to a pressurized floating separating tank 200 via a pump 4. Here, bubble mixed water made by the gas and liquid mixing and dissolving apparatus 300 is supplied under pressure, the bubble bonds the filthy matter contained in the treated water and gives buoyancy to float and separate, and filthy matter led out from the upper part. The supernatant water remained is filtered to fresh water via a sand filter tank 7, an activated carbon filter tank 8. A feed water tank 5 supplies washing water to the gas and liquid mixing and dissolving apparatus 300 and the sand filter tank 7. A compressor 6 supplies compressed air to the gas and liquid mixing and dissolving apparatus 300 and the activated carbon filter tank 8.

Figure 1A:
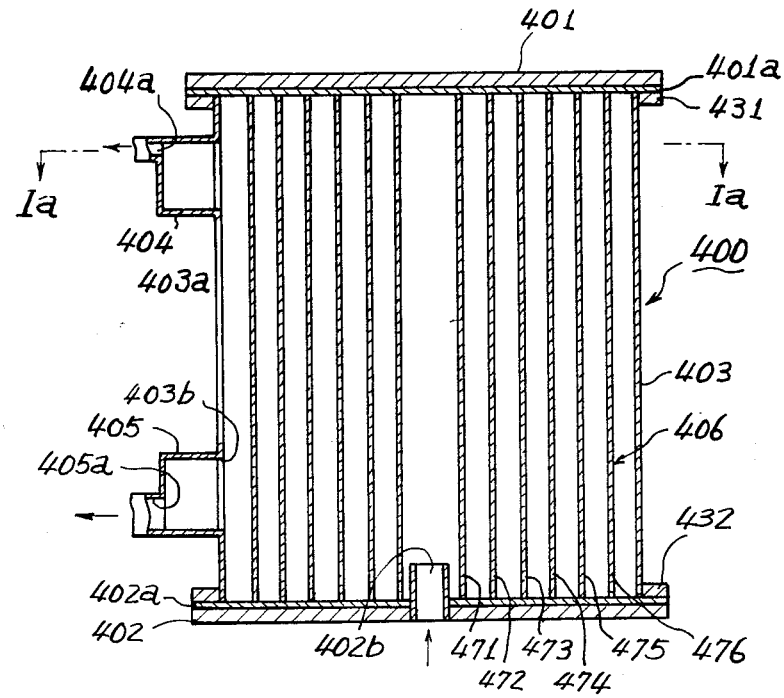
FIG. 1a is a longitudinal side sectional view of a first separating tank.
Figure 1B:
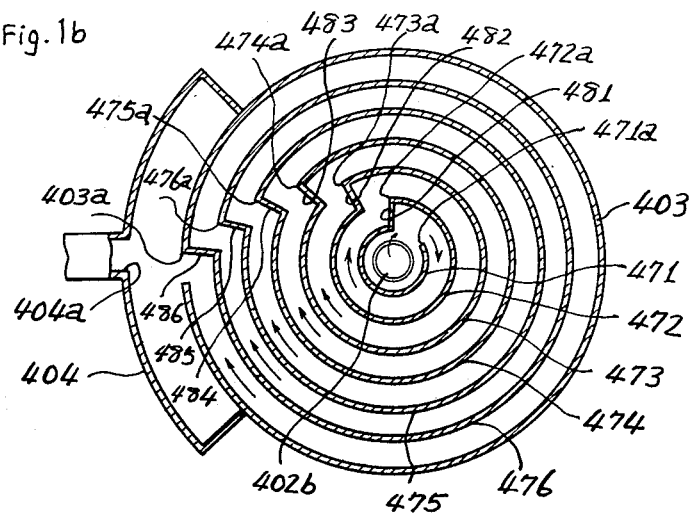

Referring to FIGS. 1a and 1b, there is shown the first separating tank 400 according to the present invention, which generally includes an upright cylindrical side wall 403 having flange portions 431 and 432 at its upper and lower portions, and an upper wall 401 and a lower wall 402 respectively fixed to the upper and lower faces of said side wall 403 through packing members 401a and 402a as shown. At the central portion of the lower wall 402, a fluid inlet port 402b is provided, and at one side of the side wall 403, an oil collecting portion 404 is mounted at an upper portion through an oil hole 403a, while a water collecting portion 405 is provided at a lower portion through a water hole 403b. An oil outlet port 404a is opened for the oil collecting portion 404, with a water outlet port 405a being opened for the water collecting portion 405.

Thus, the interior of the separating tank is partitioned by a plurality (six pieces in the embodiment) of cylindrical members 470 (referred to as cylinders hereinbelow) increased by the same diameters and connecting plates 480 so as to form vortex-like flow passages. More specifically, the above cylinders 470 are disposed so as to be overlapped from the central portion of the tank in such an order as a first cylinder 471, a second cylinder 472,—and a sixth cylinder 476. In the respective cylinders 471 to 476, there are provided a first slit 471a, a second slit 472a—and a sixth slit 476a in the same height as the cylinders, and the respective slits are formed in the state as deviated in the angle, by a slit width counterclockwise in FIG. 1b from the first cylinder towards the sixth cylinder.

The first cylinder 471 and the second cylinder 412 are water-tightly connected through welding and the like, by a first connecting plate 481 via the first slit 471a so as to form the vortex-like flow passage therebetween. Meanwhile, the second cylinder 472 and the third cylinder 473 are connected to each other through the second slit 472a by a second connecting plate 482. Subsequently, the connection is similarly made successively up to the sixth cylinder 476, while the sixth cylinder 476 and the side wall 403 are also connected by a sixth connecting plate 486 in the similar manner through the slit 476a, oil hole 403a, and water hole 403b. Accordingly, within the separating tank, one sheet of the vortex-like partition plate 406 is formed so as to provide the vortex-like flow passage having the same flow passage cross section and directed clockwise as indicated by arrows in FIG. 1b.

The second separating tank 500 is formed same as the first separating tank 400.

In FIG. 1, there is shown the oil component flocculating arrangement 100 which includes a mixing unit wherein an inorganic flocculant mixing apparatus 110, an alkali agent mixing apparatus 120 and a high polymeric flocculant mixing apparatus 130 are connected in series to each other, an inorganic flocculant pump 101, an alkali agent pump 102, a high polymeric flocculant pump 103, and a chemical agent tank 100b in which an inorganic flocculant tank 104, an alkali agent tank 105 and a high polymeric flocculant tank 106 are accommodated.

Subsequently, the construction of each of the above mixing apparatuses will be explained only with respect to the inorganic flocculant mixing apparatus 110, and detailed descriptions of the other two mixing apparatuses 120 and 130 will be abbreviated, since they have constructions generally similar to that of the mixing apparatus 110.

Figure 2:
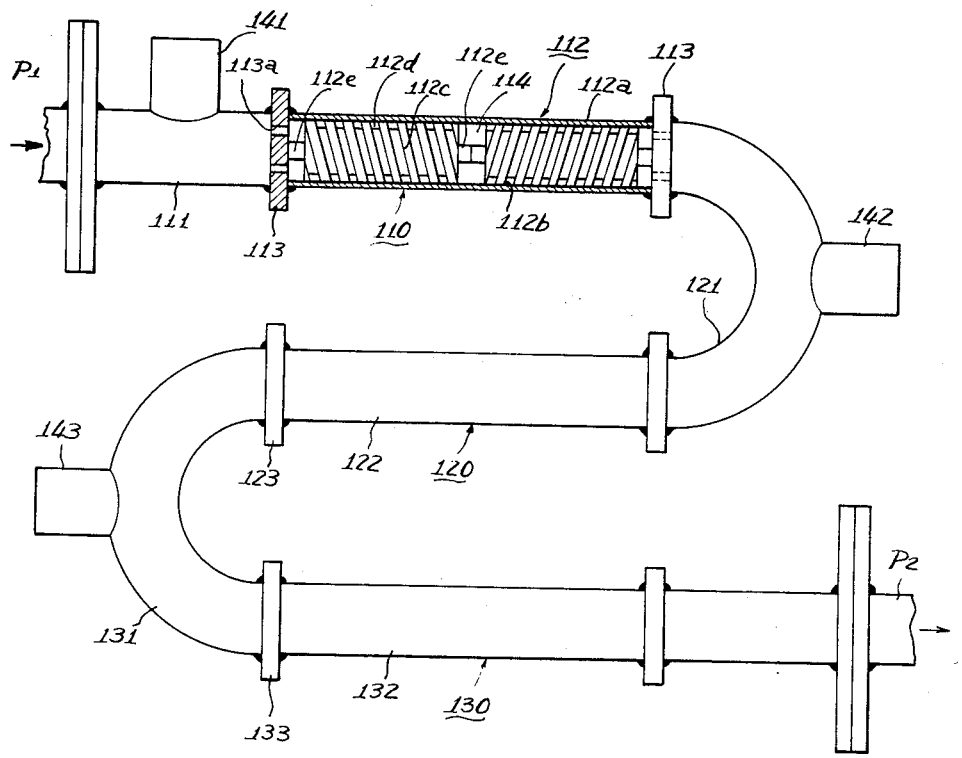
FIG. 2 is a top plan view, partly broken away, showing on an enlarged scale the construction of a mixing apparatus.

At a fluid inlet side of the inorganic flocculant mixing apparatus 110, there is connected an open end of a supply pipe 141 of the inorganic flocculant fed through the pump 101. As is shown in FIG. 2, the inorganic flocculant mixing apparatus 110 includes an inlet cylinder portion 111 which receives fluids to be mixed as introduced thereinto, and a spiral flow passage member 112 connected to the downstream side of the inlet cylinder portion 111 through an end plate 113 having a fluid port 113a, with the supply pipe 141 being connected to open into the inlet cylinder portion 111. The spiral flow passage member 112 further includes an outer cylinder 112a, and a spiral groove member 112b concentrically disposed within the outer cylinder 112a, with the inner circumferential surface of the cylinder 112a being held in contact with the outer circumferential surface of the spiral groove member 112b.

The spiral grove member 112b referred to above is formed with a plurality of rows of spiral grooves 112d (two rows in the drawing) so that a plurality of spiral flow passages may be formed on the outer peripheral surface at one axis right-angled cross section of a columnar member 112c. These spiral grooves 112d are directed around the columnar member 112c at least more than one time (360° C.) (four times in the drawing).

The columnar member 112c is provided, at its opposite ends, with projections 112e, and a plurality of the spiral groove members 112b (two members 112b in the embodiment) are disposed in series side by side, with the projections 112e being held in contact with each other as illustrated. Accordingly, at the outer peripheral portions of the respective projections 112e, spaces are formed so as to serve for liquid mixing chambers 114. It is to be noted here that the neighboring spiral goove members 112b are arranged to be formed with the spiral grooves or threads directed in directions opposite to each other.

The downstream side of these spiral groove members 112b is sectioned by another end plate 113 so as to be connected to an inlet cylinder portion 121 of a subsequent alkali agent mixing apparatus 120.

It should be noted here that a symbol P1 represents a liquid supply pipe from a separating tank and to the mixing apparatus, and a symbol P2 denotes a transport pipe to a subsequent step, while numerals 141, 142 and 143 represent chemical agent supply pipes for the respective mixing apparatuses.

For the inorganic flocculant, for example, polyaluminum chloride is employed, and for the alkali agent, caustic soda and the like is used. Meanwhile, as the high polymeric flocculant, there may be suitably employed an agent mainly composed of acrylic polyamide such as Aronflock A-101 (Trade name of an agent manufactured by Toa Gosei Chemical Industry Co., Ltd. in Tokyo, Japan), and an organic agent of polyacrylic amide group.

Figure 3:
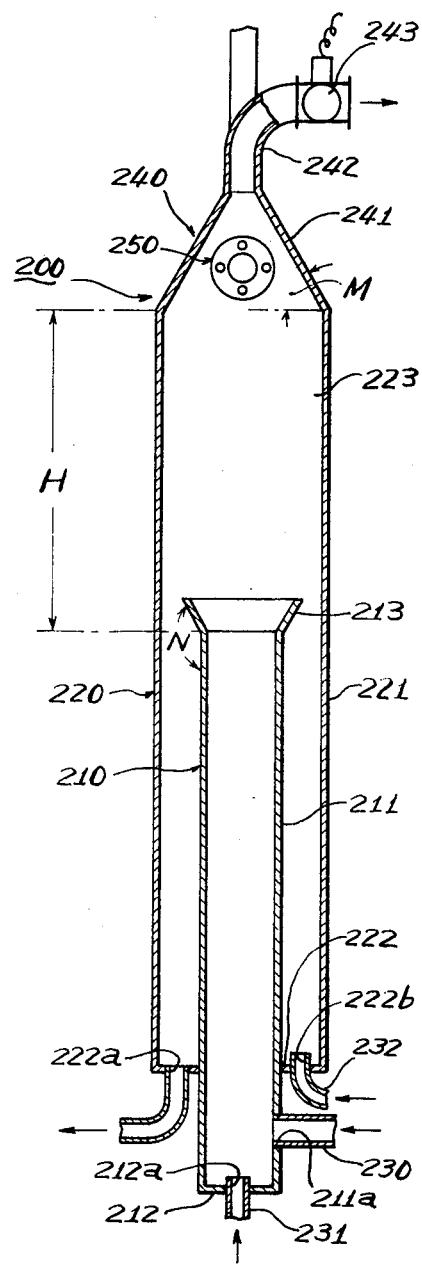
FIG. 3 is a longitudinal side sectional view of the pressurized floating separating tank.

In the FIG. 3, the pressurized floating separating tank 200 has the first cylinder 210, the second cylinder 220 of vertical and the filthy matter lead-out pipe 240 connected to the upper part of the second cylinder 220.

The first cylinder 210 is of cylindrical having the bottom, a filthy water inlet 211a is provided on the lower wall of the body 211. The inlet 211a is connected by the filthy water supply pipe 230. Also, bubble mixed water inlet 212a is opened on the plane bottom 212, the said inlet 212a is connected by a first bubble mixed water lead-in pipe 231. On the upper end of the first cylinder 210, a circular ring reflux part 213 projects outer direction at the angle N of more than 90 degree to less than 180 degree (shown 150 degree).

The second cylinder 220 has cylinder body 221 externally and concentrically cover the first cylinder 210 by means of a clearance pipe not shown. And, the bottom 222 of the second cylinder 220 is provided with treated water outlet 222a, and a plurality of bubble water inlets 222b are provided equally spaced in circumferential direction. These inlets 222b are connected with a second bubble mixed water inlet pipe 232.

In the upper part of the second cylinder 220, there is remained a space of a filthy matter floating and separating area 223 which has hight H from the first cylinder 210.

The filthy matter lead-out pipe 240 include cone-like part 241 upper reduced its diameter connected to the upper end of the second cylinder and elbow 242. On the top of the elbow 242, an electric magnetic valve 243 intermittently and automatically opened and closed is connected, and filthy matter collected in the filthy matter lead-out pipe 240 are discharged intermittently.

On the side of the cone-like part 241 of the filthy matter lead-out pipe 240, there is at least one peep window 250, and transparent cover is provided.

In FIG. 4, there is shown a gas and liquid mixing and dissolving apparatus 300 according to the present invention, which includes a gas and liquid mixing section A for introducing therein a gas, e.g. air and water to produce bubbles, a gas dissolving section B which finely divides the bubbles in the bubble-mixed water for dissolving the gas e.g. air into water under pressure, and a surplus gas e.g. air separating tank 320 which eliminates pulsation of the liquid for separation and discharge of the surplus gas.

Thus, in the gas and liquid mixing section A, a liquid introducing pipe 311a and a gas e.g. air introducing pipe 311b are connected to a gas and liquid introducing cylinder 311 in the tubular configuration.

The gas dissolving section B includes the spiral flow passage member 312 communicated with a downstream side of said gas and liquid mixing section A through an end plate 313 having a fluid opening 313a. The spiral flow passage member 312 is formed same as the spiral flow passage member 112 of the oil component flocculating apparatus 100.

Namely, the spiral flow passage member 312 further includes an outer cylinder 312a, and a spiral groove member 312b concentrically disposed within the outer cylinder 312a, with the inner circumferential surface of the cylinder 312a being held in contact with the outer circumferential surface of the spiral groove member 312b.

The spiral groove member 312b referred to above is formed with a plurality of rows of spiral grooves 312d (two rows in the drawing) so that a plurality of spiral flow passages may be formed on the outer peripheral surface at one axis right-angled cross section of a columnar member 312c. These spiral grooves 312d are directed around the columnar member 312c at least more than one time (360° C.) (four times in the drawing).

The columnar member 312c is provided, at its opposite ends, with projections 312e, and a plurality of the spiral groove members 312b (first, second and third pieces in the embodiment) are disposed in series side by side, with the projections 312e being held in contact with each other as illustrated. Accordingly, at the outer peripheral portions of the respective projections 312e, spaces are formed so as to serve for liquid mixing chambers 314. It is to be noted here that the neighboring spiral groove members 312b are arranged to be formed with the spiral grooves or threads directed in directions opposite to each other.

At the most downstream side of the spiral groove member 312b, there is provided a retainer 316, while an upper face at the end portion of the cylinder 312a is cut off for providing a fluid outlet port 315 so as to be opened into the lower portion of the subsequent surplus gas separating tank 320.

The surplus gas separating tank 320 comprises a cylindrical side wall 321 provided, at its lower portion, with a gas-dissolved water outlet port 321a, a top wall 322 having a gas e.g. air discharge port 322a provided with a gas e.g. air discharge spherical valve 322b, and a bottom wall 323. The interior of the tank 320 is partitioned, at its generally intermediate portion in the vertical direction, by a partition plate 330 having a large number of holes 331 formed therein. The gas-dissolved water outlet 321a is connected to the bubble mixed water lead-in pipe 231, 232 of the pressurized floating separating tank 200.

There are further provided a water guage 324 and a pressure detecting port 325 in the arrangement of FIG. 4.

Subsequently, the state of functionings of the above will be described hereinbelow.

Upon introduction of an oiland water mixed fluid into the fluid inlet port 402b of the first separating tank 400, said fluid advances from the first cylinder 471 towards the sixth cylinder 476. In the above case, in the long flow passage partitioned by the vortex-like partition plate 406, the oil component is gradually started to be floated or raised according to the gravity difference, and also the oil gathers inner side of radial direction of curved flow passage under centrifugal force and becomes coarse grain. And most of such oil component is collected into the upper layed portion before reaching the last portion so as to be stored at the oil collecting portion 404. Such oil component is discharged through the oil outlet port 404a.

The water thus processed is fed through the water outlet 405a to the coarse grain making member 9. Here, the oil sticks and gathers to wires and etc., and small oil grain gathers each other and becomes large grain increasing buoyancy, and enters in the second separating tank 500. Here, the large oil grains are separated and eliminated same as the above, and fluid is led in the oil component flocculating apparatus 100.

Next, in the respective mixing apparatuses 110, 120 and 130 of the oil component flocculating apparatus 100, when the respective agents are introduced into the corresponding cylinder portions 111, 121 and 131, such agents are each mixed within the mixing apparatuses so as to flow down according to the order of disposition. Therefore, since the spiral flow passages are formed within the mixing apparatuses, long flow passages may be obtained by a short linear distance, and thus, due to the prolongation of the mixing process, the mixing efficiency is improved, while it becomes possible to form the mixing apparatus into a compact size. Moreover, since each of the spiral groove members includes a plurality of rows of grooves, the flow passages may be divided into small areas for improvement of the mixing efficiency. Mean-while, in the mixing chambers 14 provided between the plurality of the above spiral groove members, an overall mixing is expedited. Furthermore, since the rotating direction of the fluid is changed over in the reverse direction by forming the directions of threading for the spiral grooves, to be opposite to each other between the neighboring spiral groove members in the axial direction, turbulent flow is produced thereby for a still further improvement of the mixing efficiency.

By repeating the mixing and blending as described so far, water and chemical agents are uniformly mixed so as to expedite the flocculation of the suspended material for contribution to purification of filthy water.

Next in the pressurized floating separating tank 200, the water mixed with filthy matter flocculated by the flocculating apparatus 100 is led to the first cylinder 210 via the filthy water inlet 211a under pump pressure, in the first cylinder 210 small bubble mixed water is let via bubble mixed water lead-in pipe 231 at the same time. Then the filthy matter in the first cylinder 210 are fitted with bubbles and increases its buoyancy. This filthy matter is separated from fresh water in the floating and separating area 223 and floats to be stored in the filthy matter lead-out pipe 240. And the fresh water eliminated the filthy matter goes down from upper side to lower side between the first cylinder 210 and the second cylinder 220 and flows out from the treated water outlet 222a. Among this operation a part of filthy matter flows into treated water side, but this filthy matter returned by the reflux part 213. Namely, filthy matter flowed into treated water side sticks to slow water speed part of lower face of the reflux part 213, and gathers to become block-like filthy matter increasing buoyancy, and also in given buoyancy by sticking to bubble from the second bubble mixed water lead-in pipe 232. Finally ascending speed of the filthy matter by buoyancy become larger than descending speed of the fluid, then the filthy matter return to the upper side and comes in the filthy matter lead-out pipe 240.

The filthy matter floated and gathered in the floating and separating area 223 of the second cylinder 220 and the cone-like part 241 is pushed out by water pressure when the electric magnetic valve 243 is opened intermittently. The filthy matter gathered in the cone-like part 241 is useful for preventing the water flows out from the elbow 242, when the pressurized floating and separating tank swings or inclines.

The peep window 250 serves as the light window, and when the filthy matter packs in the filthy matter lead-out pipe 240, the filthy matter is loosen when window opens.

According to the result of experiment, the filthy matter was not blocked in the filthy matter lead-out pipe 240 when the inclination angle M against horizontal of the cone-like part 241 is 50°–75° (60° is desirable). The angle N of the reflux part 213 against the outer surface of the first cylinder is 90°–165° (150° is standard).

In the gas and liquid mixing and dissolving apparatus 300, when a gas e.g. air and water under approximately same pressure (about 7.2 kg/cm$^2$G) are supplied into the gas and liquid introducing cylinder 311, the both are mixed and fed into the gas dissolving section B through the fluid port 313a. Since the spiral flow passages are formed within the mixing apparatuses, long flow passages may be obtained by a short linear distance, and thus, due to the prolongation of the mixing process, the mixing and dissolving efficiency is improved, while it becomes possible to form the apparatus into a compact size. Moreover, since each of the spiral groove members includes a plurality of rows of grooves, the flow passages may be divided into small areas for improvement of the mixing and dissolving efficiency. Meanwhile, in the mixing chambers 314 provided between the plurality of the above spiral groove members, an overall mixing and dissolving is expedited. Furthermore, since the rotating direction of the fluid is changed over in the reverse direction by forming the directions of threading for the spiral grooves, to be opposite to each other between the neighboring spiral groove members in the axial direction, turbulent flow is produced thereby for a still further improvement of the mixing and dissolving efficiency. As described above, in the long process by the spiral grooves 312d, the air is forcibly dissolved into water, and after approximately 20% of the air has been dissolved, the remainder is held in the state of bubbles.

The gas mixed and dissolved water as described above is introduced into the surplus gas separating tank 320, and is prevented from pulsation by passing through the holes 331 of the partition plate 330, which formation of bubbles into coarse particles is also obstructed. Thus, the gas-dissolved water is introduced through the outlet 321a into a pressurizing floating separating tank 200 (Under pressure at about 0.9 kg/cm$^2$G) which is a subsequent low pressure zone, where mixed water having fine bubbles, for example, in the order of 30$\mu$ is produced instantaneously, and moreover, according to the result of measurements, the bubbles are stably held without disappearance over a long period of time for about two minutes.

On the other hand, the surplus gas e.g. air is discharged outside through the gas discharge part 322a at the upper portion. The spherical valve 322b at the gas discharge port 322a closes the port 322a by its weight, and opens said port 322a when the surplus gas e.g. air amount has increased above a predetermined value for discharge of such surplus gas, and thus, the interior of the tank is maintained under approximately a constant pressure (about 7 kg/cm$^2$G). Meanwhile, when the water level within the tank is raised excessively high, the port 322a is closed for preventing discharge of water.

The treated water from the pressurized floating separating tank 200 is cleaned again via filter tank 7, 8.

Figures 5, 6, 7:
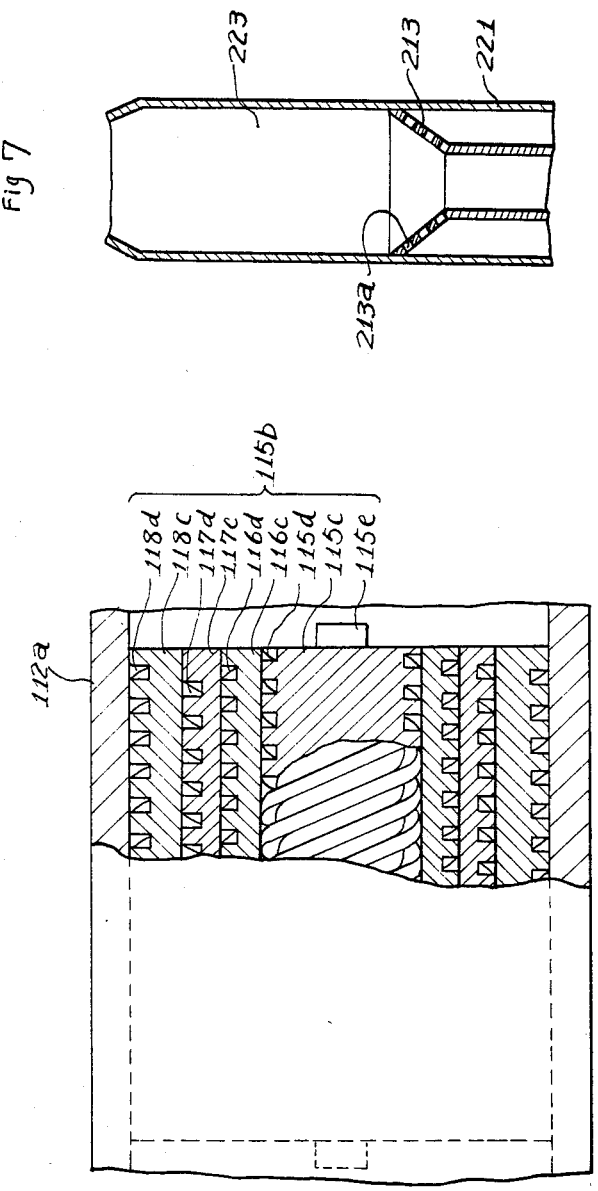
FIG. 5, FIG. 6 are sectional view of another embodiment of the spiral grove member.
FIG. 7 is a longitudinal side sectional view of the another embodiment of the pressurized floating separating tank.

FIG. 5 shows a spiral groove member 115b according to another embodiment of the present invention for the oil component flocculating apparatus 100 and the gas and liquid mixing and dissolving apparatus 300, in which the number of flow passages in one axis cross section is increased so as to increase the flow passage area on the whole. More specifically, the spiral groove member 115b includes an outer cylinder 112a, more than one inner cylinders 116c, 117c and 118c (three inner cylinders in the drawing) engaged with each other and fitted into the inner peripheral surface of the outer cylinder 12a, and a columnar member 115c concentrically fitted into the inner side of the smallest inner cylinder 116c. In the outer circumferential surfaces of the respective parts, spiral grooves 115d, 116d, 117d and 118d and provided as shown. The directions of threading of the spiral grooves are arranged to be opposite to each other between the neighboring members in the radial direction. Meanwhile, in the case as illustrated the spiral grooves 115d of the columnar member 115c and the spiral grooves 116d of the smallest inner cylinder 116c are of four-threaded screws, those of the intermediate inner cylinder 117c are of six-threaded screw, and those of the largest inner cylinder 118c are of eight-threaded screw. It may be so modified that the spiral grooves as described above are provided in the inner circumferential surfaces of the inner cylinders and outer cylinders. In this case, no spiral grooves are provided in the columnar member. The modification of the arrangement according to the present invention also includes the case in which the spiral grooves are not provided in some of the inner cylinders, with flow passages such as grooves, etc. being formed along the axial direction, or the case in which no flow passages are provided at all. In other words, it may serve the purpose if the spiral grooves are provided in at least one outer circumferential surface or inner circumferential surface of the inner cylinders and the columnar member.

FIG. 6 shows a further embodiment according to the present invention, in which sets of a plurality of spiral tubes 150a and 150b disposed side by side within a cylinder 151 as a spiral flow member, are extended through end plates 152 so as to be secured thereat. The plurality of sets of the spiral tubes turned in directions opposite to each other, are coupled in series to each other through mixing chambers 153, with the respective spiral tubes being open into said mixing chambers 153. It may be so modified, in correspondence to FIG. 5, that the spiral tubes are provided in plurality in the spiral radial direction. The above embodiment also displays the function and effect similar to those in the previous embodiment in which the spiral grooves are provided.

As shown in FIG. 7, at the reflux part 213 of the pressurized floating separating tank 200, the circular ring is elongated to the inner surface of the first cylinder 221, and a number of holes 213a are provided with the circular ring. Also, the bottom wall 212 of the first cylinder may be of cone figure with wide upper side.

In the gas and liquid mixing and dissolving apparatus 300, the gas and liquid mixing section A and the dissolving section B may be directed vertically in the axial lines thereof. In the above case, the upper end of the dissolving section B is connected to the bottom wall 323 of the surplus gas discharge tank 320. The pressures of gases and liquids should properly be in the range of about 4 to 10 kg/cm$^2$G. The spherical valves 322b may be replaced by an ordinary pressure adjusting valve, etc. Moreover, for the gas and liquid mixing section A, an arrangement for mixing the liquid and gas through a nozzle may be employed, and in short, it will serve the purpose if liquids and gases can be properly mixed.

Figure 9:
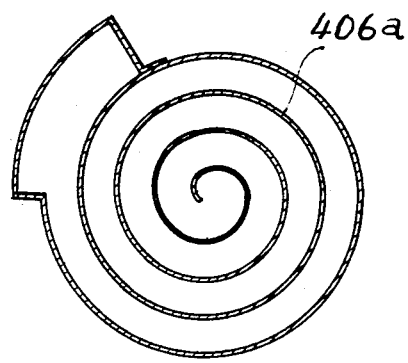
FIG. 9 is a cross section taken along the line IX—IX in FIG. 8.
Figure 10:
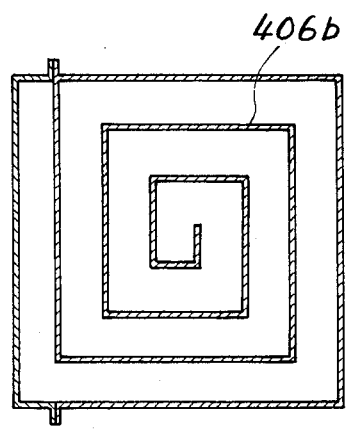
FIG. 10 is a horizontal cross section of the more another embodiment of the separating tank.
Figure 8:
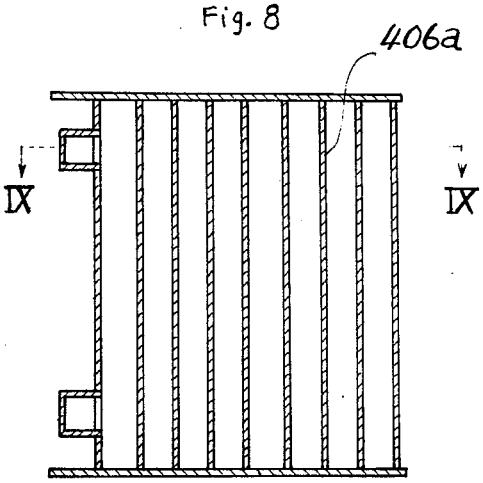
FIG. 8 is a longitudinal side sectional view of the another embodiment of the separating tank.

In FIGS. 8 and 9, there is shown another embodiment of the separating tank 400, 500 in which the portition plate including the cylinders and connecting plates as described above is replaced by a vortex-like plate 406a bent in a smooth configuration. In a further embodiment as shown in FIG. 10, there is employed a rectangular cylindrical vortex-like partition plate 406b bent at corner angles as illustrated.

It should be noted here that in the foregoing embodiments of the separating tank 400, although the oil collecting portion 4 and the water collecting portion 5 are provided, these may be omitted and replaced by the oil outlet 3a and the water outlet 3b provided on the side wall 3. (the second separating tank 500 is same as the first tank 400).

I claim:

1. A water treatment apparatus for treating filthy water having such as oil, suspension substance, which comprises a flocculating apparatus having mixing apparatus for flocculant and water and flocculant supplying system, a pressurized floating separating tank floating and separating the flock under pressure receiving the fluid from the flocculating apparatus, a gas and liquid mixing and dissolving apparatus leading the bubble water into the fluid from the flocculating apparatus connected to the lower part of the pressure floating separating tank, the mixing apparatus which includes an inlet cylinder portion for receiving fluids to be mixed as introduced thereinto, and first spiral flow passage members having first spiral flow passages directed therearound through more than 360° and connected to a forward end of said inlet cylinder portion, the pressurized floating separating tank comprises, a first cylinder having filthy water inlet at lower portion, a second cylinder concentrically provided with said first cylinder so as to externally cover the latter through a gap and provided purified water outlet at bottom, a filthy matter lead-out pipe having a portion reduced in its diameter and connected to the upper end of the second cylinder, a bubble mixed water lead-in pipe connected at the lower end of the first cylinder, the gas and liquid mixing and dissolving apparatus which includes a gas and liquid mixing section for introducing and mixing the gas and liquid, a gas dissolving section having second spiral flow passage members connected to a downstream side of said gas and liquid mixing section for forming second spiral flow passages, and a surplus gas separating tank in which the end portion of said gas dissolving section is opened and which is intended to separate and discharge the surplus gas.

2. A water treatment apparatus as claimed in claim 1, wherein the second spiral flow passage member includes an outer cylinder and a spiral groove member concentrically disposed within the outer cylinder.

3. A water treatment apparatus as claimed in claim 2, wherein the second spiral groove member is formed with a plurality of rows of spiral grooves on the outer peripheral surface.

4. A water treatment apparatus as claimed in claim 2, wherein the second spiral groove member includes more than one inner cylinders and a columnar member concentrically fitted into the inner side of the inner cylinder, and the spiral groove is provided at least one outer circumferential surface or inner circumferential surface of the inner cylinders and the columnar member.

5. A water treatment apparatus as claimed in claim 2, 3, or 4 wherein the second spiral groove member is provided at its opposite ends with projection and a plurality of the spiral groove members are disposed in series side by side with the projections being held in contact with each other, at the outer peripheral portions of respective projections, spaces are formed so as to serve for liquid mixing chamber.

6. A water treatment apparatus as claimed in claim 2, 3, or 4, wherein the second spiral groove members are disposed in series in axial direction, and the neighboring second spiral groove members are arranged to be formed with the spiral grooves directed in directions opposite to each other.

7. A water treatment apparatus as claimed in claim 4, wherein the directions of threading of the sprial grooves are arranged to be opposite to each other between the neighboring members in the radial direction.

8. A water treatment apparatus as claimed in claim 2, 3 or 4, wherein the second spiral groove member is formed with a plurality of rows of spiral grooves so that a plurality of spiral flow passages may be formed on one cylindrical peripheral surface.

9. A water treatment apparatus as claimed in claim 1 wherein the second spiral flow passage member comprises spiral tubes and end plates extended through and secured opposite side of the tubes.

10. A water treatment apparatus as claimed in claim 9, wherein the plurality of sets of the spiral tubes and end plates are disposed side by side in axial direction with a space of fluid mixing chamber.

11. A water treatment apparatus as claimed in claim 9, wherein the plurality of sets of the spiral tubes and end plates are disposed in axial direction in series, and the spiral tubes turned in direction opposite to each other in axial direction.

12. A water treatment apparatus as claimed in claim 9, wherein the plurality of spiral tubes disposed in spiral axial direction and the spiral tubes turned in direction opposite to each other in radial direction.

13. A water treatment apparatus as claimed in claim 9, wherein the spiral tube is formed with a plurality rows so that a plurality of spiral flow passage may be formed on one cylindrical peripheral surface.

14. A gas and liquid mixing and dissolving apparatus which includes a gas and liquid mixing section for introducing and mixing the gas and the liquid, a gas dissolving section having spiral flow passage members connected to a downstream of said gas and liquid mixing section for forming the spiral flow passages, said spiral groove members being provided at its opposite end with a projection and a plurality of spiral groove members disposed in series side by side with the projections being held in contact with each other at the outer peripheral portions of respective projections and spaces formed so as to serve for liquid mixing chamber and a surplus gas separating tank in which the end portion of said gas dissolving section is opened and which is intended to separate and discharge the surplus gas.

15. A gas and liquid mixing and dissolving apparatus which includes a gas and liquid mixing section for introducing and mixing the gas and liquid, a gas dissolving section having spiral flow passage members connected to a downstream side of said gas and liquid mixing section for forming the spiral flow passages, said spiral grooves members being disposed in series in axial direction and the neighboring spiral groove members being arranged to be formed with the sprial grooves directed in the directions opposite to each other and a surplus gas separating tank in which the end portion of said gas dissolving section is open and which is intended to separate and discharge the surplus gas.

16. A gas and liquid mixing and dissolving apparatus which includes a gas and liquid mixing section for introducing and mixing the gas and the liquid, a gas dissolving section having spiral flow passage members connected to a downstream side of said gas and liquid mixing section for forming the spiral flow passages, said spiral groove member including more than one inner cylinders and a columnar member concentrically fitted into the inner side of the inner cylinder and the spiral groove being provided in at least one outer circumferential surface of inner circumferential surface of the inner cylinders and the columnar member and directions of threading of the spiral grooves are arranged to be opposite to each other between the neighboring members in the radial direction and a surplus gas separating tank in which the end portion of said gas dissolving section is opened and which is intended to separate and discharge the surplus gas.

17. A gas and liquid mixing and dissolving apparatus which includes a gas and liquid mixing section for introducing and mixing the gas and liquids, a gas dissolving section having spiral flow passage members connected to a downstream side of said gas and liquid mixing section for forming the spiral flow passages, said spiral flow passage members comprising a plurality of sets of the tubes and end plates disposed side by side in axial direction with a space of fluid mixing chamber and a surplus gas separating tank in which the end portion of the said gas dissolving section is opened and which is intended to separate and discharge the surplus gas.

18. A gas and liquid mixing and dissolving apparatus which includes a gas and liquid mixing section for introducing and mixing the gas and liquid, a gas dissolving section having spiral flow passage members connected to a downstream side of said gas and liquid mixing section for forming the spiral flow passages, said spiral flow passage members comprising a plurality of sets of spiral tubes and end plates disposed in axial direction in series and the spiral tubes turned into direction opposite to each other in axial direction and a surplus gas separating tank in which the end portion of the said gas dissolving section is opened and which is intended to separate and discharge the surplus gas.

* * * * *